US012128802B2

(12) United States Patent
Kang et al.

(10) Patent No.: US 12,128,802 B2
(45) Date of Patent: Oct. 29, 2024

(54) VEHICLE SEAT COVER

(71) Applicants: Hyundai Motor Company, Seoul (KR); Kia Corporation, Seoul (KR); LX HAUSYS, Ltd., Seoul (KR)

(72) Inventors: Gun Kang, Seoul (KR); Won Jin Seo, Gyeonggi-do (KR); Hye Min Lee, Gyeonggi-do (KR); Myoung Ryoul Lee, Seoul (KR); Yong Bae Jung, Seoul (KR); Chang Hoon Lee, Seoul (KR); Kyung Hak Kang, Seoul (KR); De Eun Park, Seoul (KR); Gyu Suk Lee, Daegu (KR)

(73) Assignees: Hyundai Motor Company, Seoul (KR); Kia Corporation, Seoul (KR); LX HAUSYS, Ltd., Seoul (KR)

( * ) Notice: Subject to any disclaimer, the term of this patent is extended or adjusted under 35 U.S.C. 154(b) by 141 days.

(21) Appl. No.: 17/959,781

(22) Filed: Oct. 4, 2022

(65) Prior Publication Data
US 2023/0122818 A1   Apr. 20, 2023

(30) Foreign Application Priority Data
Oct. 18, 2021   (KR) ........................ 10-2021-0138047

(51) Int. Cl.
*B60N 2/70* (2006.01)
*B32B 5/02* (2006.01)
(Continued)

(52) U.S. Cl.
CPC ............ *B60N 2/7017* (2013.01); *B32B 5/026* (2013.01); *B32B 5/26* (2013.01); *D04B 21/20* (2013.01); *B32B 2260/021* (2013.01); *B32B 2260/046* (2013.01); *B32B 2262/0261* (2013.01); *B32B 2262/0276* (2013.01); *B32B 2262/132* (2021.05); *B32B 2605/003* (2013.01); *D10B 2331/02* (2013.01); *D10B 2331/04* (2013.01); *D10B 2403/0111* (2013.01); *D10B 2505/12* (2013.01)

(58) Field of Classification Search
CPC .......... B60N 2/58; B60N 2/60; B60N 2/5891; B60N 2/7017; B32B 5/026; B32B 5/26; D04B 21/20
See application file for complete search history.

(56) References Cited

U.S. PATENT DOCUMENTS

| 2007/0141299 | A1* | 6/2007 | Hong ...................... B32B 5/026 15/228 |
| 2010/0075143 | A1* | 3/2010 | Hashimoto ............ D03D 15/33 264/211.22 |
| 2021/0300215 | A1* | 9/2021 | Fitzpatrick ........... B60N 2/6027 |

FOREIGN PATENT DOCUMENTS

KR   101147472 B1   5/2012

* cited by examiner

*Primary Examiner* — Milton Nelson, Jr.
(74) *Attorney, Agent, or Firm* — Fox Rothschild LLP

(57) ABSTRACT

Disclosed are a vehicle seat cover made of an artificial suede. The vehicle seat cover includes a top layer provided in the top portion, a bottom layer provided in the bottom portion, and a intermediate layer positioned between the top layer and the bottom layer. Each of the layers has a tricot texture, and the top layer includes the first yarn having a configuration in which the dope dyed microfiber yarn and the first high shrinkage yarn are interlaced. Thus, the suede material may have superior friction fastness and the light fastness and the vehicle seat cover is manufactured at less cost than a vehicle seat cover made of a conventional artificial suede.

15 Claims, 2 Drawing Sheets

(51) Int. Cl.
*B32B 5/26* (2006.01)
*D04B 21/20* (2006.01)

VEHICLE SEAT COVER

CROSS REFERENCE TO RELATED APPLICATION

The present application claims priority to Korean Patent Application No. 10-2021-0138047, filed Oct. 18, 2021, the entire contents of which are incorporated herein for all purposes by this reference.

TECHNICAL FIELD

The present invention relates to a vehicle seat cover including by impregnating a fabric with a polyurethane (PU) resin.

BACKGROUND

Suede materials have a variety of advantages, such as a luxurious appearance, a smooth touch, a sensation of comfort, as well as functionality such as slip prevention. Such suede materials are used in a variety of parts, such as seats, furniture, interior decorations, and props, and demand for suede materials is increasing.

Suede materials may include natural materials or artificial materials. In particular, when artificial suede materials are manufactured by a related-art technology, there has been a problem of non-uniform quality caused by different densities or dispersions occurring during the manufacture.

In addition, there is a problem of difficult management of suede materials due to a complicated manufacturing process, and there are problems and limitations in physical properties, such as light fastness, rubbing color fastness, and dye transferability, due to limited dyeing technology.

In particular, when a suede material of the related art is used in a vehicle seat cover, there may be problems in that manufacturing cost is increased and friction fastness and light fastness are reduced.

The foregoing is intended merely to aid in the understanding of the background of the present invention, and is not intended to mean that the present invention falls within the purview of the related art that is already known to those skilled in the art.

SUMMARY OF THE INVENTION

In preferred aspects, provided is a vehicle seat cover including a top layer provided in the top portion, a bottom layer provided in the bottom portion, and an intermediate layer positioned between the top layer and the bottom layer. Each of the layers may be configured as a tricot texture, and the top layer may include a first yarn including a dope dyed microfiber yarn and a high shrinkage yarn interlaced with the dope dyed microfiber yarn.

A term "high shrinkage yarn" as used herein refers to a yarn or a continuous/plied strand of fibers or filaments having a shrinkage rate of about 10%, about 15%, about 20%, about 25%, about 30%, about 35%, about 40%, about 45%, or about 50% or greater.

A term "dope dyed microfiber yarn" as used herein refers to a yarn including microfibers and produced using dope-dying process, e.g., for by dying yarns or fibers and then weaving the yarns, which may provide environmentally friendly and efficient dyeing process. For example, fibers and yarns may be dyed using solution dyeing or adding dye to a polymer that a filament will be extruded from.

In an aspect, provided is a vehicle seat cover including: a top layer provided in a top portion; a bottom layer provided in a bottom portion; and an intermediate layer positioned between the top layer and the bottom layer. The top layer may include a first yarn having a configuration in which a dope dyed microfiber yarn and a first high shrinkage yarn are interlaced.

A thickness of the dope dyed microfiber yarn after elution split may suitably range from about 0.06 to about 0.30 denier.

The dope dyed microfiber yarn may include one or more microfiber including polyester, polyamide, and combinations thereof.

A shrinkage of the first high shrinkage yarn may range from about 30% to about 50%.

A fineness of single yarns of high shrinkage polyester to be braided may range from about 1.0 to about 5.0 deniers.

The first yarn may include a braid of about 8 to 16 composite yarns and each of the composite yarns may include the dope dyed microfiber yarn and the first high shrinkage yarn interlaced with the dope dyed microfiber yarn.

The top layer may further include nap.

The intermediate layer may include a second yarn including a second high shrinkage yarn having a shrinkage of from about 20% to about 50%.

The second yarn may include a second high shrinkage yarn including a braid of about 12 to 24 single yarns.

The fineness of each of the single yarns may range from about 1.0 to about 5.0 deniers.

The bottom layer may include a third yarn including an ordinary yarn having a shrinkage of about 6% to about 8%.

The bottom layer may include a braid of about 140 to 148 single yarns.

The fineness of each of the single yarns may suitably range from about 1.0 to about 5.0 deniers.

The vehicle seat cover may have a longitudinal elongation at break of from about 35% to about 100%.

Also provided is a vehicle including the vehicle seat cover as described herein.

According to various exemplary embodiments of the present invention, the vehicle seat cover may be advantageously by including a suede material having superior friction fastness and the light fastness and may be manufactured at less cost than a vehicle seat cover made of an artificial suede of the related art.

Other aspect of the invention are disclosed infra.

BRIEF DESCRIPTION OF THE DRAWINGS

The above and other objectives, features, and other advantages of the present invention will be more clearly understood from the following detailed description when taken in conjunction with the accompanying drawings, in which.

DETAILED DESCRIPTION

Figure 1:
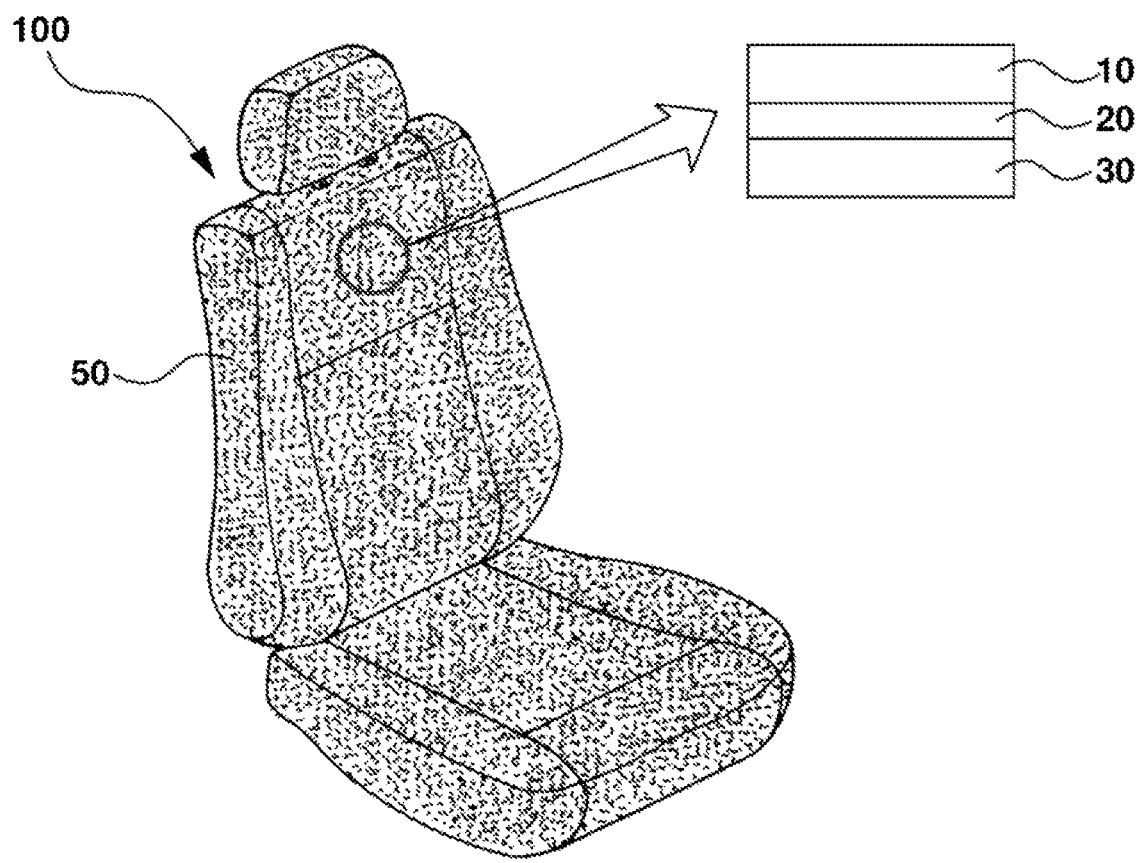
FIG. 1 shows an exemplary vehicle seat cover according to an exemplary embodiment of the present invention and an vehicle seat in which the vehicle seat cover is used.

The objectives described above, and other objectives, features and advantages will be clearly understood from the following preferred embodiments with reference to the annexed drawings. However, the present invention is not limited to these embodiments and will be embodied in different forms. The embodiments are suggested only to offer thorough and complete understanding of the disclosed contents and sufficiently inform those skilled in the art of the technical concept of the present invention.

Like numbers refer to like elements throughout the description of the figures. In the drawings, the sizes of structures are exaggerated for clarity. It will be understood that, although the terms first, second, etc. may be used herein to describe various elements, these elements should not be limited by these terms and are used only to distinguish one element from another. For example, within the scope defined by the present invention, a first element may be referred to as a second element and similarly, the second element may be referred to as the first element. Singular forms are intended to include plural forms as well, unless context clearly indicates otherwise.

It will be further understood that the terms "comprises" and/or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that when an element such as a layer, film, region or substrate is referred to as being "on" another element, it can be directly on the other element or an intervening element may also be present. It will also be understood that when an element such as a layer, film, region or substrate is referred to as being "under" another element, it can be directly under the other element or an intervening element may also be present.

Unless the context clearly indicates otherwise, all numbers, values and/or expressions that express ingredients, reaction conditions, polymer compositions and amounts of mixtures used in the specification are approximations that reflect various uncertainties of measurement occurring inherently in obtaining these values among other things. For this reason, it should be understood that in all cases, the term "about" should modify all the numbers, values and/or expressions. Further, unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when number ranges are disclosed in the description, these ranges are continuous and include all numbers from the minimum to the maximum including the maximum within the ranges unless otherwise defined. Furthermore, when the range is referred to as an integer, it includes all integers from the minimum to the maximum including the maximum within the range, unless otherwise defined.

It should be understood that, in the specification, when the range is referred to regarding a parameter, the parameter encompasses all figures including end points disclosed within the range. For example, the range of "5 to 10" includes figures of 5, 6, 7, 8, 9, and 10, as well as arbitrary sub-ranges such as ranges of 6 to 10, 7 to 10, 6 to 9, and 7 to 9, and any figures, such as 5.5, 6.5, 7.5, 5.5 to 8.5 and 6.5 to 9, between appropriate integers that fall within the scopes of ranges. In addition, for example, the range of "10% to 30%" encompasses all integers that include figures such as 10%, 11%, 12% and 13% and all integers up to 30% and any sub-ranges of 10% to 15%, 12% to 18%, or 20% to 30%, as well as any figures, such as 10.5%, 15.5% and 25.5%, between appropriate integers that fall within the scopes of ranges.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

In a situation in which a suede material of the related art is used in a vehicle seat cover, manufacturing cost was expensive and rubbing fastness and light fastness were insufficient, which are problematic.

In this regard, the present inventors have intensively studied to solve the above-described problems. As a result, the inventors have discovered that a vehicle seat cover including a top layer provided in the top portion, a bottom layer provided in the bottom portion, and an intermediate layer positioned between the top layer and the bottom layer. Each of the layers may have a tricot texture, and the top layer includes a first yarn comprised of a dope dyed microfiber yarn and a high shrinkage yarn interlaced with the dope dyed microfiber yarn, may be manufactured at low cost and have superior friction fastness and light fastness compared to a vehicle seat cover made of an artificial suede of the related art, and thereby, has completed a vehicle seat cover according to the present invention.

FIG. 1 shows a cross-sectional view of an exemplary vehicle seat cover 50 according to an exemplary embodiment of the present invention and an exemplary vehicle seat 100 in which the vehicle seat cover is used. The shape, structure, and the like of the vehicle seat 100 illustrated in FIG. 1 are illustrative only, and may be variously modified.

For example, the vehicle seat cover 50 may include a top layer 10, a bottom layer 30, and an intermediate layer 20 interposed between the top layer 10 and the bottom layer 30, provided sequentially in the direction of the thickness of the vehicle seat cover 50.

Particularly, the top layer 10 may include a first yarn comprised of a dope dyed microfiber yarn and a first high shrinkage yarn interlaced with the dope dyed microfiber yarn. The intermediate layer 20 may include a second yarn comprised of a second high shrinkage yarn having a shrinkage of about 20% to 50%. The bottom layer may include a third yarn comprised of an ordinary yarn having a shrinkage of about 6% to about 8%.

Figure 2:
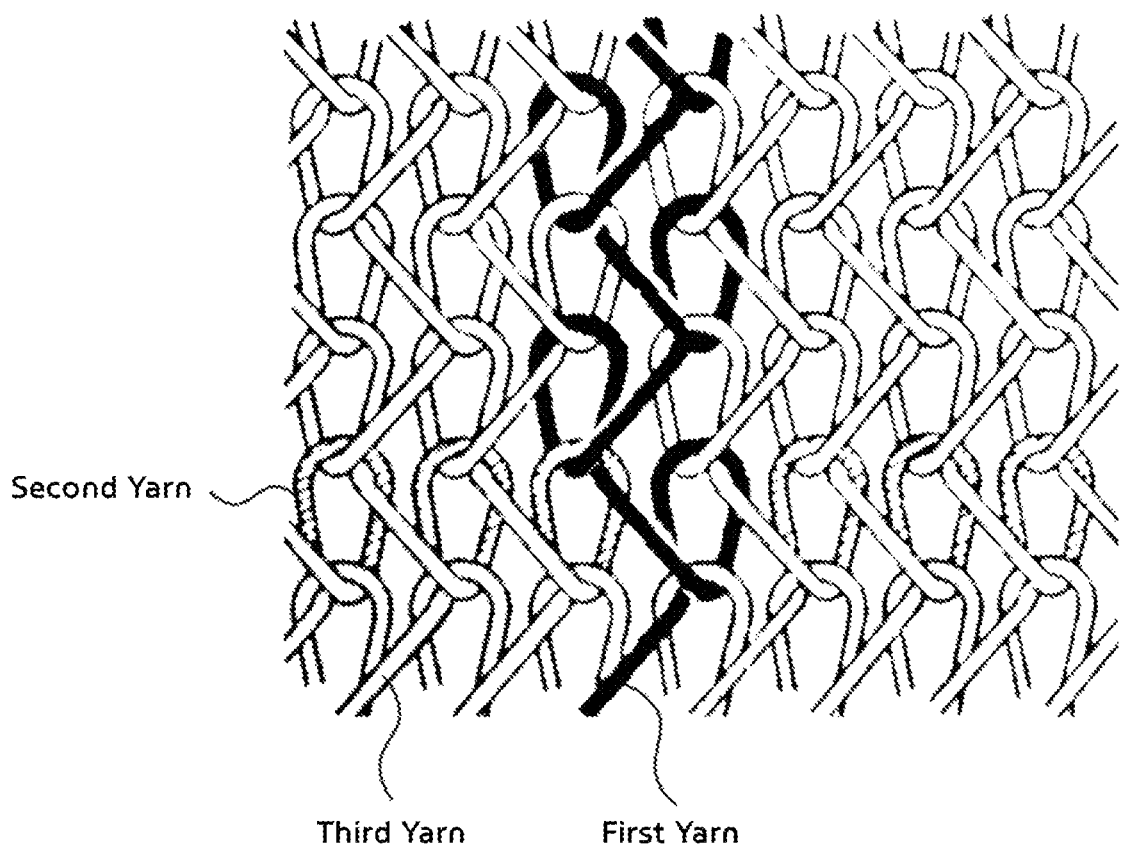
FIG. 2 shows an exemplary tricot texture of the vehicle seat cover according to an exemplary embodiment of the present invention.

FIG. 2 shows an exemplary tricot texture of the vehicle seat cover according to an exemplary embodiment of the present invention.

For example, the first yarn, the second yarn, and the third yarn included in the respective layers may be configured in a tricot texture in a plan view.

The term "tricot texture" used herein may be a "warp knitted fabric" having a fabric texture as illustrated in FIG. 2.

In the warp of the tricot texture, the yarn may extend in the vertical direction. In addition, the yarn may have the shape of "X", ">", or "<" between wells. When the fabric is enlarged by pulling the fabric in the lateral direction, yarns between wells in the tricot texture may form a diagonal shape (or a diagonally extending shape) such as an "X", ">", or "<" shape.

Thus, the tricot texture of the vehicle seat cover may advantageously act to meet physical properties (e.g., properties capable of predetermined elongation ratios in lateral and longitudinal directions) required in the vehicle seat cover.

The vehicle seat cover of top layer 10 may be a layer capable of realizing a luxurious suede emotion and superior light fastness and preventing crocking.

Top Layer

The top layer has the shape of a braid of first yarns each including a dope dyed microfiber yarn and a first high shrinkage yarn interlaced with the dope dyed microfiber yarn. The dope dyed microfiber yarn may include one or more types of microfibers including polyester, polyamide, or combinations thereof.

Particularly, the first yarn may be produced by braiding about 8 to 16 composite yarns each including the dope dyed microfiber yarn and the first high shrinkage yarn interlaced with the dope dyed microfiber yarn. When the number of yarns braided is beyond the above range and too small, the weight is less than a desired weight and the density of nap is excessively low. Thus, a surface effect cannot be obtained, which is problematic. In contrast, when the number of yarns braided is too large, problems such as tearing of weaved yarns, flying yarns, and overweight may occur.

The dope dyed microfiber yarn according to an embodiment may be a sea-island microfiber including soluble polyester as a sea component and a polyester black dope dyed yarn as an island component. Preferably, the black dope dyed yarn may contain a carbon black component of about 0.2% to 3% by weight of a total weight of the island component. Particularly, the content of the carbon black component may be in the range of from about 1.5% to about 3% by weight. In addition, when a light grey or beige series component is used, a content ratio of about 0.15% by weight may be dope dyed. Preferably, color matching may be performed in a dyeing process, a polyurethane (PU) impregnation process, or a post process, such as a surface treatment process.

In addition, the thickness of the dope dyed microfiber yarn, particularly, the thickness of the dope dyed microfiber yarn after elution split may be in the range of from about 0.06 to about 0.30 denier. When the thickness of the dope dyed microfiber yarn is beyond this range and excessively thin, the friction fastness may be low and handprints may remain, thereby disadvantageously causing the external appearance to be dirty. In contrast, when the thickness of the dope dyed microfiber yarn is excessively thick, a rough surface tactile sensation may be obtained, thereby disadvantageously reducing the sensation of comfort of the suede material.

In addition, the first high shrinkage yarn may include a polyester high shrinkage yarn that provides an excellent support due to high elasticity so as to improve weaving properties. During a shrinking process, the polyester high shrinkage yarn may be shrunk at a high shrinkage, thereby allowing the microfiber alone to protrude from the surface.

Thus, the shrinkage of the first high shrinkage yarn according to an embodiment may be in the range of from 30% to 50%. Here, the shrinkage (%) means boiling water shrinkage (%). Particularly, the boiling water shrinkage may be calculated by the following Equation 1.

$$\text{Elongation Ratio} = \text{Shrunk Length} - \text{Unshrunk Length}/\text{Unshrunk Length} \times 100 \quad [\text{Equation 1}]$$

Here, requirements for boiling water shrink include treatment in boiling water (e.g., at temperature of 100° C.) for about 30 minutes.

When the shrinkage of the first high shrinkage yarn is beyond this range and excessively low, the yarn may disadvantageously remain and be exposed on the surface even after the shrinking process so as to provide a rough surface tactile sensation. Since the yarn is not a dope dyed yarn, the surface may appear in a different color, due to the difference in dyeing. In contrast, an excessively large shrinkage may disadvantageously cause troubles such as shape instability during weaving or processing.

The fineness of single yarns of high shrinkage polyester to be braided may be in the range of from about 1.0 to about 5.0 deniers.

The surface yarn of the top layer according to an embodiment has the following properties. During shrinking processing after weaving, the surface yarn may shrink the first yarn by about 30% to about 50%, thereby excellently maintain the thickness as well as the volume. In addition, the surface yarn may cause the dope dyed yarn having a low shrinkage to protrude so as to facilitate formation of nap and increase the density. In addition, the light fastness of the dope dyed yarn may be improved and crocking may be prevented.

The content of the surface yarn of the top layer may be about 40% to 50% by weight of 100% by weight of the entire vehicle seat cover. When the weight of the surface yarn is less than the predetermined content, e.g., less than about 40% by weight, weight requirement may not be met or a bottom texture may be exposed after processing, thereby causing the layer to appear like an inexpensive fabric. In contrast, when the weight of the surface yarn is greater than the predetermined content, e.g., greater than about 50% by weight, weaving may be difficult and curling occurs in the fabric, thereby causing processing to be difficult.

In addition, the tricot texture of the vehicle seat cover may have a pile structure, i.e., a loop structure. Thus, when punching is completely performed to form a ventilation hole, unwinding may be prevented. Since the loop structure may be torn by a napping process, it is possible to produce fuzz while maintaining the tricot texture. As a result, nap may be more easily proceed on the outer portion of the top layer. The top layer may include more fuzz. Consequently, the vehicle seat cover can advantageously realize a soft tactile sensation and suede characteristics due to the nap, as well as improve light fastness and reduce crocking.

Intermediate Layer

The intermediate layer may be a layer configured to improve the density of the nap of the surface yarn.

Particularly, the intermediate layer may include a second yarn comprised of a second high shrinkage yarn having a shrinkage of about 20% to 50%. The shrinkage corresponds to boiling water shrinkage, and thus may be calculated by the same method as in Equation 1 above. When the shrinkage of the second high shrinkage yarn is less than the predetermined value, e.g., less than about 20%, a rough surface tactile sensation may be obtained after shrinking processing. In contrast, an excessively large shrinkage, e.g., greater than about 50%, may disadvantageously cause troubles such as shape instability during weaving or processing. The second yarn serves to improve the nap density of the surface yarn. The second yarn may include single yarns having a suitable shrinkage.

The second yarn may be a braid of a plurality of single yarns (i.e., second shrunk yarns), particularly, a braid of about 12 to 24 single yarn. Here, the fineness of the single yarns to be braided may be in the range of from about 1.0 to about 5.0 deniers. When the number or fineness of single yarns to be braided is beyond this range and excessively large or small, the quality of the nap may be disadvantageously degraded.

Bottom Layer

The bottom layer may be a layer configured to improve mechanical properties of the vehicle seat cover.

The bottom layer may include an ordinary yarn having a smaller shrinkage than the high shrinkage yarn of the intermediate layer in order to improve mechanical strength. Particularly, the bottom layer may include a third yarn including an ordinary yarn having a shrinkage of from about 6% to about 8%. The shrinkage corresponds to boiling water shrinkage, and thus may be calculated by the same method as in Equation 1 above. When the shrinkage of the ordinary yarn is beyond this range, mechanical properties may be disadvantageously degraded.

The ordinary yarn may be a braid of a plurality of single yarns, particularly, a braid of about 140 to 148 single yarns. When the number of single yarns to be braided is beyond this range to be excessive small, mechanical properties may be disadvantageously degraded.

The fineness of single yarns to be braided may be in the range of from about 1.0 to about 5.0 deniers.

When the fineness of single yarns is less than the predetermined value, e.g., less than about 1.0 denier, mechanical properties may be disadvantageously degraded. In contrast, when the fineness of single yarns is greater than the predetermined value, e.g., greater than about 5.0 deniers, the tactile sensation of a product may be excessively hard, thereby disadvantageously degrading the quality of the product.

The content of the third yarn of the bottom layer may be of about 48% to 51% by weight of 100% by weight of the entire vehicle seat cover. When the weight of the third yarn is less than the predetermined content, e.g., less than about 48% by weight, mechanical properties may be disadvantageously degraded. In contrast, when the weight of the third yarn is greater than the predetermined content, e.g., greater than about 51% by weight, the ratio of the high shrinkage yarn may be relatively reduced to reduce the density of the nap in the surface, thereby disadvantageously degrading the quality of the product.

Here, the bottom layer may include a plurality of layers each including the third yarn including an ordinary yarn meeting the above-described characteristics while not exceeding this weight range, thereby improving mechanical properties.

That is, the ordinary yarn has the above-described characteristics, and thus is characterized to improve mechanical properties of the vehicle seat cover according to an embodiment including the according to an embodiment.

The elongation ratio of the vehicle seat cover including the top layer, the intermediate layer, and the bottom layer meeting the above-described characteristics may be in the range of from about 35% to about 100%. When the elongation ratio is less than the predetermined value, e.g., 35%, there may be problems in that an additional operation, such as a sewing operation or a wrapping operation, may be difficult. In contrast, when the elongation ratio is greater than the predetermined value, e.g., 100%, there may be a problem of wrinkling or crumpling in which the seat cover is crumpled.

As a result, the vehicle seat cover includes the first yarn comprised of a tricot texture having a configuration in which the dope dyed microfiber yarn and the first high shrinkage yarn both meeting specific conditions are interlaced. Thus, the vehicle seat cover can have superior friction fastness and light fastness, and can be manufactured at low cost compared to a vehicle seat cover made of an artificial suede of the related art. In addition, since the intermediate layer and the bottom layer are included as additional layers, other properties, such as mechanical properties, can be advantageously improved.

EXAMPLE

Hereinafter, the present invention will be described in more detail with reference to Examples. The following Examples are provided for illustrative purposes only for a better understanding of the present invention, and the scope of the present invention is not limited thereto.

Example 1: Manufacture of Vehicle Seat Cover

A polyester dope dyed sea-island yarn including a triangular cross-sectional island component and having a final fineness of 0.3 denier, obtained by a weight loss process, and a polyester high shrinkage yarn having a single yarn fineness of 2.5 denier and a boiling water shrinkage of 40% were used and interlaced to form an interlaced yarn. Then, the interlaced yarn having a final fineness of 115 d/36f, a high shrinkage yarn having a final fineness of 30 d/12f, and a polyester yarn having a final fineness of 75 d/144f were manufactured into a tricot texture.

The manufactured tricot texture is heat treated and set at a temperature of 160° C. for 60 seconds.

Each of the surface and the rear surface of the tricot texture completed as above was napped 6 to 8 times, brushed one time, and then heat treated at a temperature of 180° C. for 60 seconds.

The tricot texture was impregnated with a PU solution produced by diluting polycarbonate (PC)-based PU in which the solid content was 30% and the 100% modulus is 30 and 4,4'-dimethylformamide at a 100:200 ratio, coagulated by passage through a coagulation bath, and sufficiently water washed by passage through a water washing bath.

The tricot texture was directly weight-reduced in an atmospheric reducer using a sodium hydroxide solution having a concentration of 4.0% to 5.0% at a temperature of 90° C. for 12 minutes.

Afterwards, the tricot texture was neutralized using acetic acid at a temperature of 40° C. for 10 minutes, and then dried in a tenter at a temperature of 160° C. for 60 seconds. Both surfaces of the resultant tricot texture were sanded using a 150 mesh sandpaper.

The surface treatment was performed using a printing machine, in 150 mesh conditions and according to the color, and then drying was performed. Finally, a 520 g/m² suede material having a 56 inch width according to the present invention was manufactured.

Comparative Example 1: Preparation of Vehicle Seat Cover of Related Art

A suede material was manufactured by the method of Example 1 including weaving, setting, napping, dyeing, PU impregnation, elution, and the like and according to the same standards, except for using an ordinary polyester yarn instead of the polyester sea-island yarn.

Experimental Example 1: Comparison of Light Fastness and Rubbing Coloring of Vehicle Seat Covers Vehicle seat covers according to Example 1 and Comparative Example 1 were manufactured, the light fastness and rubbing color fastness thereof were measured by following tests, and results of the tests are illustrated in Table 1 below.

Specifically, the light fastness test includes placing a piece of a specimen (having a width of 60 mm and a length of 200 mm) on a light fastness testing machine meeting the following standards, and then irradiating the specimen with 84 $MJ/m^2$. Afterwards, results were compared with those of the same specimen not irradiated with 84 $MJ/m^2$. The difference in the discoloration therebetween was determined according to the grayscale.

The rubbing color fastness test includes fixing two pieces of specimens (each having a width of 25 mm and a length of 220 mm) on a friction tester (JIS L 0823 dyeing fastness friction tester type II, 200R half-moon type test piece surface). The specimens were fixed by being covered with white cotton cloth (having a width of 50 mm and a length of 50 mm). Afterwards, a load of 2.45 N (250 gf) was applied to the specimens were, which were then reciprocated a distance (or a transition distance) of 100 mm 100 times. The degree of contamination of the white cotton cloth was determined according to the contamination grayscale.

TABLE 1

| | Light Fastness (353 Hr = 84 MJ) | Rubbing Color Fastness |
|---|---|---|
| Example 1 | Level 4 | Level 4.5 |
| Comparative Example 1 | Level 2 | Level 3 |

Light Fastness = JIS L 0804 (Dyeing fastness test to sunlight, grayscale)
Rubbing Color Fastness = JIS L 0805 (Contamination grayscale)

As shown in Table 1 above, the vehicle seat cover according to Example 1 had higher levels of light fastness and rubbing color fastness.

The vehicle seat cover according to various exemplary embodiments of the present invention includes the top layer provided in the top portion, the bottom layer provided in the bottom portion, and the intermediate layer positioned between the top layer and the bottom layer. Each of the layers may have a tricot texture, and the top layer includes the first yarn having a configuration in which the dope dyed microfiber yarn and the first high shrinkage yarn both meeting specific conditions are interlaced. Thus, the vehicle seat cover can be advantageously made of a suede material having superior friction fastness and the light fastness.

Although the exemplary embodiments of the present invention have been described for illustrative purposes, those skilled in the art will appreciate that various modifications, additions, and substitutions are possible, without departing from the scope and spirit of the present invention as disclosed in the accompanying claims.

What is claimed is:

1. A vehicle seat cover comprising:
   a top layer provided in a top portion;
   a bottom layer provided in a bottom portion; and
   an intermediate layer positioned between the top layer and the bottom layer,
   wherein the top layer comprises a first yarn in which a dope dyed microfiber yarn and a first high shrinkage yarn are interlaced.

2. The vehicle seat cover of claim 1, wherein a thickness of the dope dyed microfiber yarn after elution split ranges from about 0.06 to about 0.30 denier.

3. The vehicle seat cover of claim 1, wherein the dope dyed microfiber yarn comprises one or more microfibers comprising polyester, polyamide, or combinations thereof.

4. The vehicle seat cover of claim 1, wherein a shrinkage of the first high shrinkage yarn ranges from about 30% to about 50%.

5. The vehicle seat cover of claim 1, wherein a fineness of the first high shrinkage yarn ranges from about 1.0 to about 5.0 deniers.

6. The vehicle seat cover of claim 1, wherein the first yarn comprises a braid of about 8 to 16 composite yarns each comprising the dope dyed microfiber yarn and the first high shrinkage yarn interlaced with the dope dyed microfiber yarn.

7. The vehicle seat cover of claim 1, wherein the top layer further comprises nap.

8. The vehicle seat cover of claim 1, wherein the intermediate layer comprises a second yarn comprising a second high shrinkage yarn having a shrinkage of from about 20% to about 50%.

9. The vehicle seat cover of claim 8, wherein the second yarn comprises a second high shrinkage yarn comprising a braid of about 12 to 24 single yarns.

10. The vehicle seat cover of claim 9, wherein a fineness of each of the single yarns ranges from about 1.0 to about 5.0 deniers.

11. The vehicle seat cover of claim 1, wherein the bottom layer comprises a third yarn comprising an ordinary yarn having a shrinkage of about 6% to 8%.

12. The vehicle seat cover of claim 1, wherein the bottom layer comprises a braid of 140 to 148 single yarns.

13. The vehicle seat cover of claim 12, wherein a fineness of each of the single yarns ranges from about 1.0 to about 5.0 deniers.

14. The vehicle seat cover of claim 1, the vehicle seat cover having a longitudinal elongation at break of from about 35% to about 100%.

15. A vehicle comprising a vehicle seat cover of claim 1.

* * * * *